United States Patent
Tsuji et al.

(10) Patent No.: US 10,216,159 B2
(45) Date of Patent: Feb. 26, 2019

(54) PRODUCTION SYSTEM

(71) Applicant: FUJI CORPORATION, Chiryu (JP)

(72) Inventors: Hisayuki Tsuji, Kariya (JP); Shigenao Otane, Himeji (JP); Tomoko Ozaki, Chita-gun (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 15/111,555

(22) PCT Filed: Jan. 22, 2014

(86) PCT No.: PCT/JP2014/051255
§ 371 (c)(1),
(2) Date: Jul. 14, 2016

(87) PCT Pub. No.: WO2015/111151
PCT Pub. Date: Jul. 30, 2015

(65) Prior Publication Data
US 2016/0334766 A1 Nov. 17, 2016

(51) Int. Cl.
*G05B 15/02* (2006.01)
*G07C 3/04* (2006.01)
*G06Q 10/06* (2012.01)

(52) U.S. Cl.
CPC ........... *G05B 15/02* (2013.01); *G06Q 10/06* (2013.01); *G07C 3/04* (2013.01)

(58) Field of Classification Search
USPC ........................................ 705/7.42; 701/408
See application file for complete search history.

(56) References Cited

U.S. PATENT DOCUMENTS

| 2010/0094687 A1* | 4/2010 | Waggaman, III ...... G06Q 10/06 705/7.42 |
| 2010/0332008 A1 | 12/2010 | Knipfer et al. |
| 2012/0239179 A1 | 9/2012 | Hanawa et al. |

FOREIGN PATENT DOCUMENTS

| CN | 102473010 A | 5/2012 |
| JP | 7-295715 A | 11/1995 |
| JP | 11-19852 A | 1/1999 |
| JP | 2001-128202 A | 5/2001 |
| JP | 2004-138555 A | 5/2004 |

(Continued)

OTHER PUBLICATIONS

Extended European Search Report dated Jun. 6, 2017 in Patent Application No. 14879893.7

(Continued)

*Primary Examiner* — Lam Nguyen
(74) *Attorney, Agent, or Firm* — Oblon, McClelland, Maier & Neustadt, L.L.P.

(57) ABSTRACT

The management computer of a mounting system, when productivity is lowered, identifies an operator and work type from a work history, retrieves a management value P for the identified work type for the identified operator, and increases the management value P by an increment of "1." Then, the management computer of the mounting system, when judging that management value P is at least second threshold value P2, applies a performance restriction on the identified operator for the work of the identified work type. Thus, it is possible to curtail lowered productivity due to the same work by the same operator being repeated.

8 Claims, 6 Drawing Sheets

(56) References Cited

FOREIGN PATENT DOCUMENTS

JP    2006-201866 A    8/2006
JP    2011-227773 A    11/2011

OTHER PUBLICATIONS

Japanese Office Action dated Aug. 8, 2017 in Patent Application No. 2015-558633 (English Translation only).
International Search Report dated Feb. 18, 2014 in PCT/JP2014/051255 Filed Jan. 22, 2014.
Office Action dated Jun. 29, 2018 in Chinese Patent Application No. 201480073781.5 (submitting English language translation only), 4 pages.

\* cited by examiner

FIG. 9

| | Work type 1 | | | Work type 2 | | | Work type 3 | | |
|---|---|---|---|---|---|---|---|---|---|
| Identification information | Management value P | Warning result | Performance restriction | Management value P | Warning result | Performance restriction | Management value P | Warning result | Performance restriction |
| ID01 | 1 | Not yet | None | 0 | Not yet | None | 0 | Not yet | None |
| ID02 | 2 | Complete | None | 1 | Not yet | None | 3 | Complete | None |
| ID03 | 0 | Not yet | None | 4 | Complete | Exists | 1 | Not yet | None |
| ⋮ | ⋮ | ⋮ | ⋮ | ⋮ | ⋮ | ⋮ | ⋮ | ⋮ | ⋮ |

FIG. 10

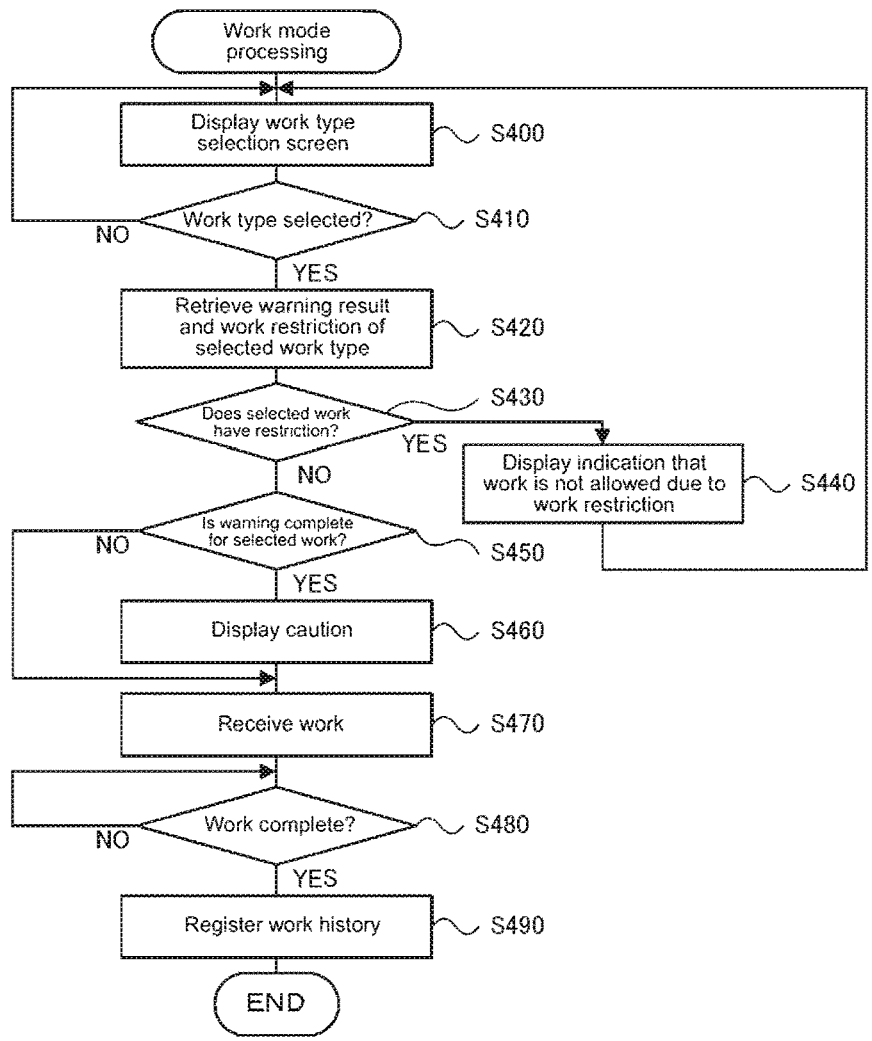

PRODUCTION SYSTEM

TECHNICAL FIELD

The present disclosure relates to a production system that is provided with a production device and that allows an operator to perform work related to production of the production device.

BACKGROUND ART

There are known production systems that allow an operator to perform work related to production of a production device. For example, the production system of patent literature 1 memorizes the difficulty level of each recovery work and the experience level of each operator, and for recovery work in the event of trouble occurring during production, judges the experience level required for the level of difficulty of the recovery work, and only allows operators with the required experience level or higher to perform the recovery work. This prevents operators who are unsuitable for a given difficulty level of recovery work from performing the recovery work, which prevents decreases in the efficiency of recovery work.

CITATION LIST

Patent Literature

PTL 1: JP-A-2001-128202

SUMMARY

The production system above is a system for applying recovery work performance restrictions retrospectively, after trouble has occurred during production; no consideration is given to preemptively applying performance restrictions on work prior to trouble occurring. With the above production system, in cases in which the contents of work to be performed by an operator are not suitable for the operator before production based on the experience and ability of the operator, by only retrospectively dealing with the problem, the trouble caused by that work may occur repeatedly. In this case, the production efficiency of the production device drops, which may lead to decreased productivity.

An object of the present disclosure is to curtail decreases in production efficiency caused by operator work.

The present disclosure of a production system uses the following device to achieve the above object.

The present disclosure of a production system is provided with a production device, allows an operator to perform work related to production of the production device, and comprises: a memorizing device that memorizes performance information of work related to production of the production device performed by an operator such that the operator is identifiable; a detecting device that detects lowered productivity of the production device; an identifying device that, in a case in which lowered productivity of the production device is detected, identifies the operator who caused the lowered productivity based on the performance information; and a restricting device that applies a performance restriction on the identified operator for the work related to production of the production device.

Effects

With the present disclosure of a production system, it is possible to prevent work related to the production of a production device being repeated by an operator who lowered productivity, and thus it is possible to curtail lowering of productivity.

Each drawing in FIG. 3 shows an example of an arrangement order of components P set by an operator.

Each drawing in FIG. 4 shows an example of reference image data set by an operator.

Each drawing in FIG. 5 shows an example of a type of suction nozzle 14 set by an operator.

Figure 6:
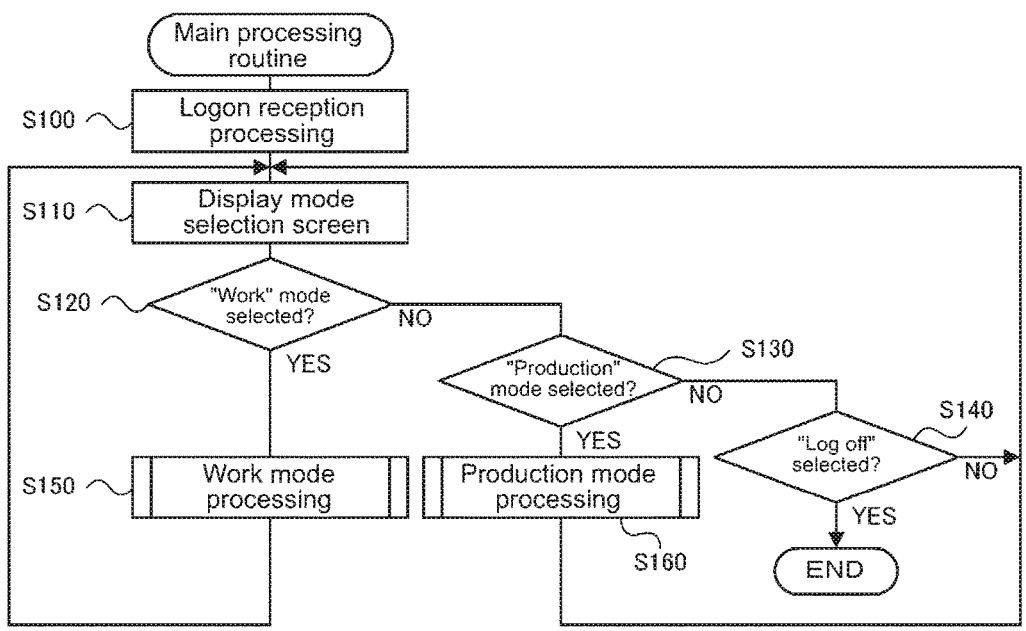

FIG. 6 is a flowchart showing an example of a main processing routine performed by CPU 81 of management computer 80.

Figure 7:
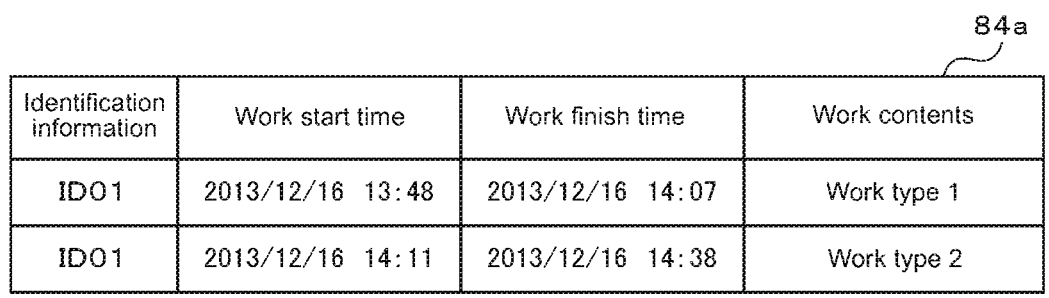

FIG. 7 shows an example of work history management information 84a.

Figure 8:
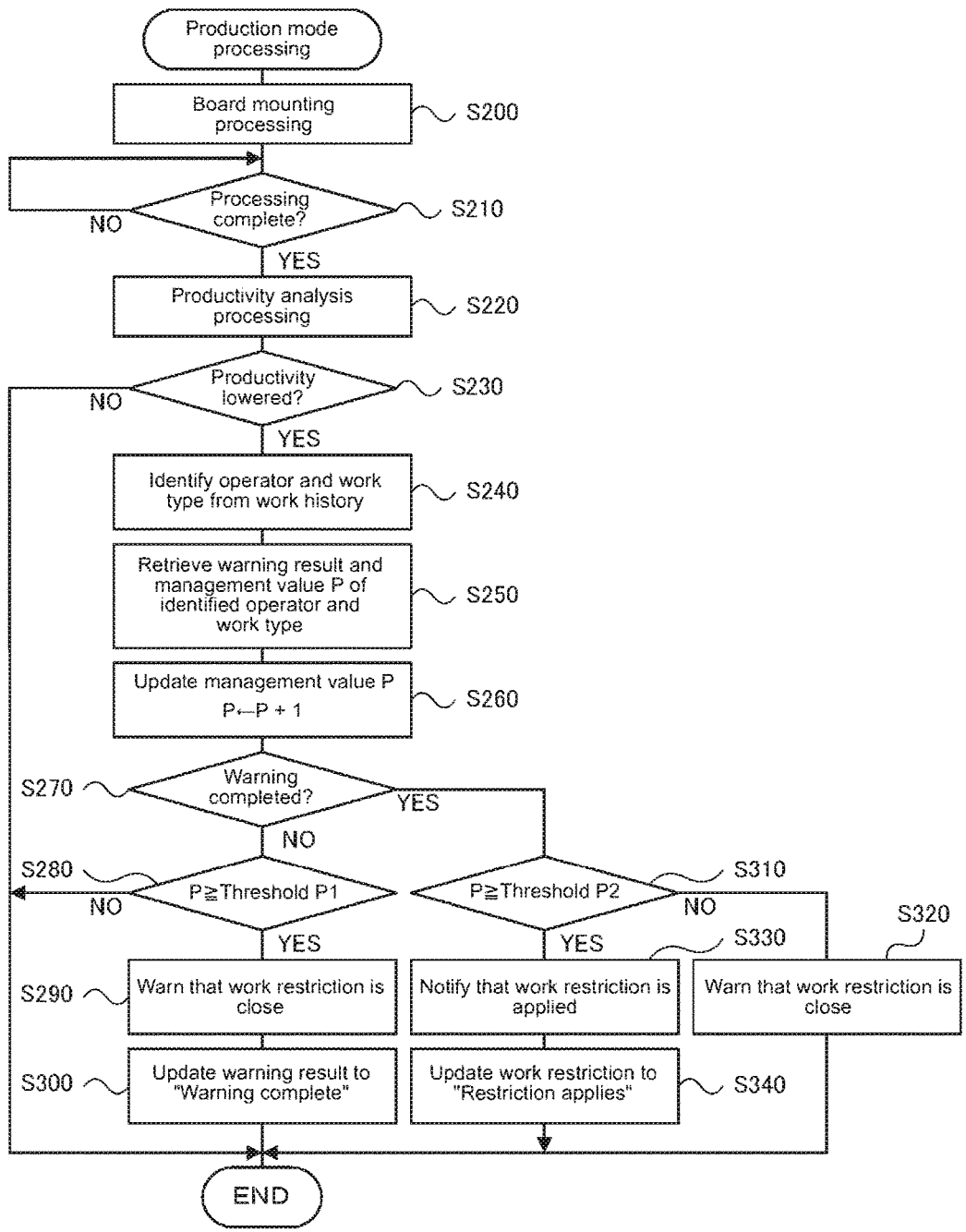

FIG. 8 is a flowchart showing an example of production mode processing performed by CPU 81 of management computer 80.

FIG. 9 shows an example of work authority management information 84b.

FIG. 10 is a flowchart showing an example of work mode processing performed by CPU 81 of management computer 80.

DESCRIPTION OF EMBODIMENTS

Figure 1:
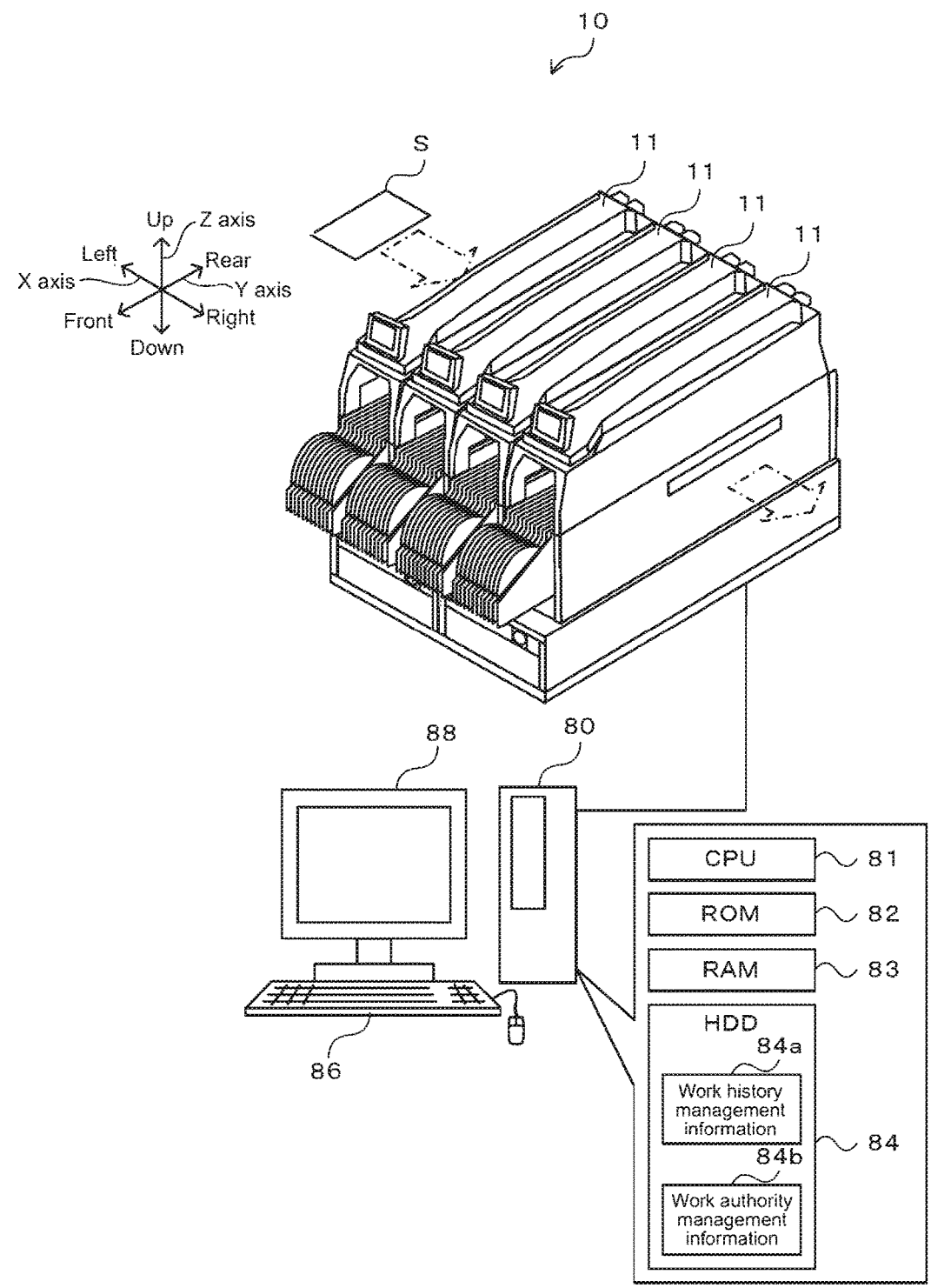
FIG. 1 shows the overall configuration of mounting system 10.
Figure 2:
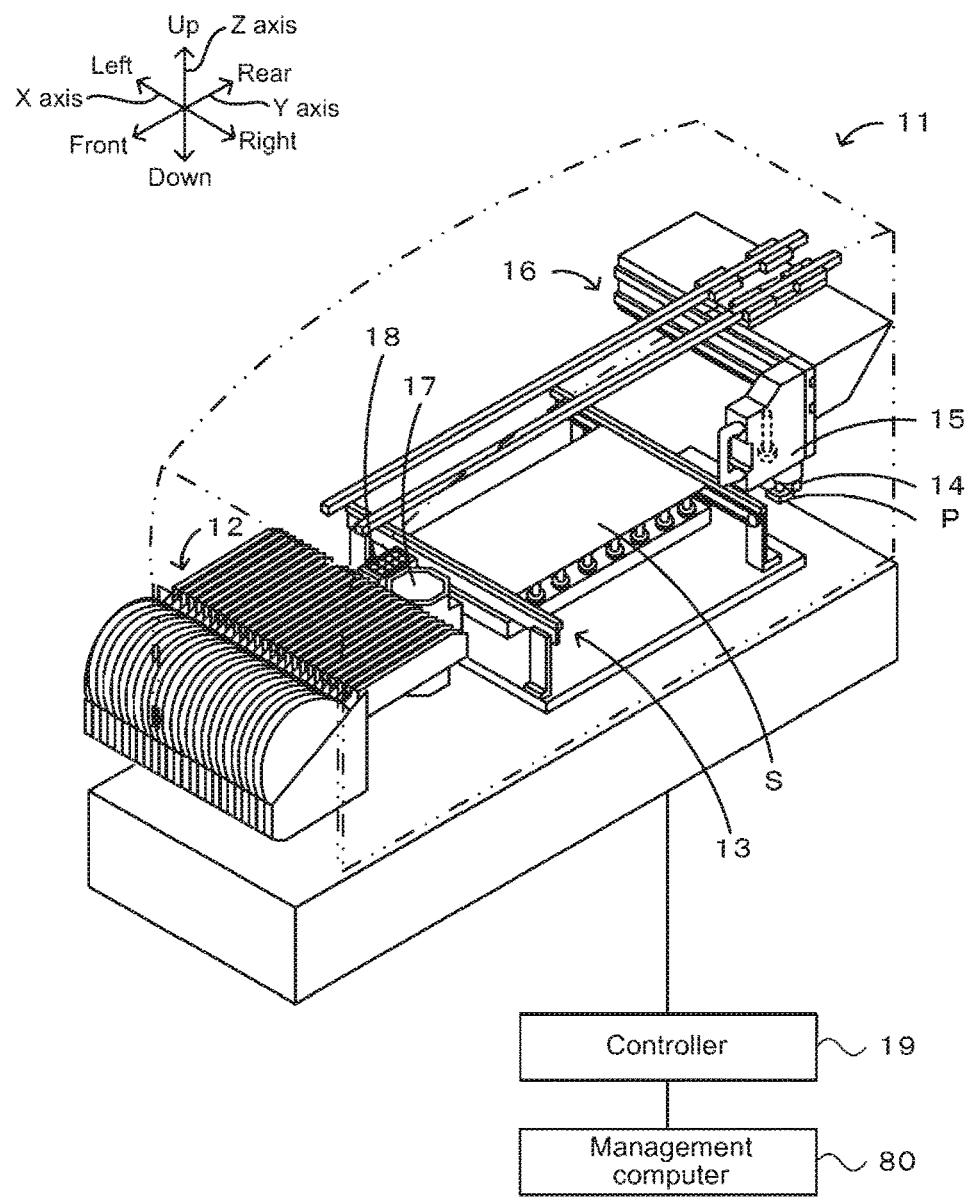
FIG. 2 shows the overall configuration of mounting device 11.

FIG. 1 shows the overall configuration of mounting system 10 and FIG. 2 shows the overall configuration of mounting device 11. For the present embodiment, in FIGS. 1 and 2, the left/right direction is the X-axis direction, the front/rear direction is the Y-axis direction, and the up/down direction is the Z-axis direction.

Mounting system 10 is provided with multiple mounting devices 11 that perform mounting processing of mounting electronic components (referred to as "component P" below [refer to FIG. 2]) on board S, and management computer 80 that performs production management of the overall system such as management of each mounting device 11. Note that, mounting processing includes processing such as arranging component P above board S, mounting, insertion, joining, and gluing. Also, multiple mounting devices 11 each perform mounting processing of components P while conveying boards S from an upstream side (the left side in FIG. 1) to a downstream side (the right side in FIG. 1) in the X direction, and because each shares the same configuration, descriptions are given without any differentiation.

As shown in FIG. 2, mounting device 11 is provided with supply unit 12 that includes reels or trays housing components P, board processing unit 13 that performs conveying and fixing of board S, mounting head 15 to which multiple (for example, four) suction nozzles 14 for picking up component P are removably attached and that is capable of moving suction nozzles 14 in the Z-axis direction, heading moving mechanism 16 capable of moving mounting head 15 in the XY direction, camera unit 17 that images component P held by suction nozzle 14, nozzle stocker 18 that stocks multiple types of suction nozzles 14, and controller 19 for performing overall device control. Controller 19 is configured from a microprocessor based around a CPU, ROM that memorizes various processing programs and the like, RAM that memorizes data temporarily, an HDD that rewritably memorizes various data required for mounting components P, and so on, and is configured to be capable of communication with management computer 80.

Mounting head 15 is moved above supply unit 12 by head moving mechanism 16 and picks up components P (for example, 4) with multiple suction nozzles 14, and is then moved above board S by head moving mechanism 16, passing over camera unit 17, so as to arrange (mount) components P in order on board S based on a predetermined arrangement order.

Figure 3A:
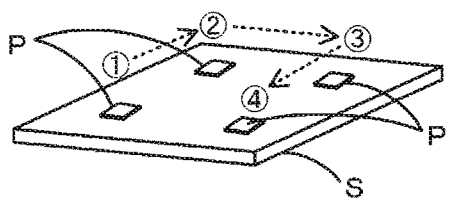
Figure 3B:
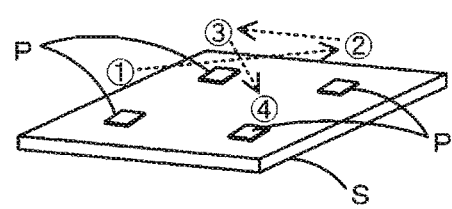

The arrangement order of components P is set by setting work performed by an operator at management computer 80, and is memorized in advance on the HDD of controller 19. Each drawing in FIG. 3 shows an example of an arrangement order of components P set by an operator. FIG. 3 shows a case in which the arrangement for four components P is set. It is desirable for the arrangement order of components P to be, from multiple arrangement orders, an arrangement order for which the moving efficiency of mounting head 15 is good; however, operators set various arrangement orders depending on their experience and ability. For example, as in FIG. 3(a), an operator may set an arrangement order with good efficiency in which the moving distance of mounting head 15 is short, or, as in FIG. 3(b), an operator may set an arrangement order with poor efficiency in which the moving distance of mounting head 15 is long. Because the moving efficiency of mounting head 15 depends on the setting of the arrangement order of components P, the time that it takes to mount components P also changes. Thus, work performed by an operator of setting the arrangement order of components P is work that affects the productivity of mounting device 11. Below, the work performed by an operator of setting the arrangement order of components P is referred to as "work type 1."

Camera unit 17, when suction nozzle 14 (mounting head 15) holding component P passes over, images the component P held by the suction nozzle 14 and outputs the captured image to controller 19. Controller 19, by comparing the captured image to reference image data, judges whether a component P with the wrong size is being held, whether the deviation of the pickup position of component P is within a tolerance range, and so on. In a case in which controller 19 judges that suction nozzle 14 is holding a component P of the wrong size, or that the deviation of the pickup position of component P is outside the tolerance range, mounting of the component P is stopped and a component pickup error (image processing error) is reported to the operator.

Figure 4A:
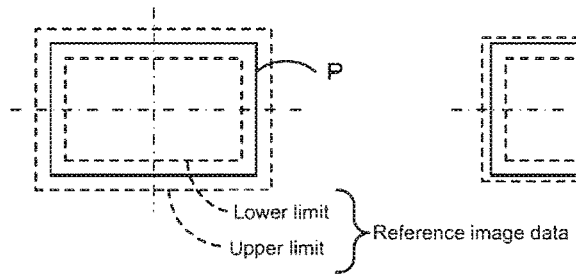
Figure 4B:
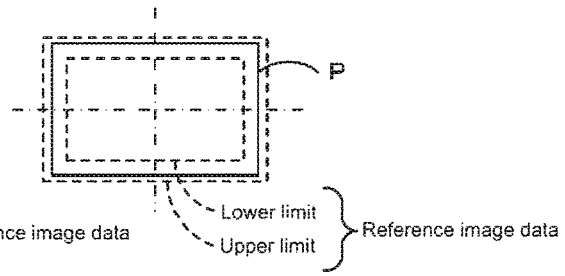

Note that reference image data is set by an operator performing setting work at management computer 80, and is memorized in advance on the HDD of controller 19. Each drawing in FIG. 4 shows an example of reference image data set by an operator. As shown, for example, for reference image data for rectangular component P, an upper limit and lower limit for the outer edges of component P are set as determined image data. It is desirable that this reference image data allows reliable detection of a wrong-sized component P and positional deviation of component P, while still allowing for size difference of components P caused by manufacturing allowances and slight positional deviation of component P; however, operators set various reference image data depending on their experience and ability. For example, as in FIG. 4(a), an operator may set suitable reference image data in which the upper limit and lower limit have a tolerance width approximately equal with respect to the outer edges of component P, or, as in FIG. 4(a), an operator may set unsuitable reference image data in which the tolerance width of the upper limit is smaller than the tolerance width of the lower limit with respect to the outer edges of component P. If reference image data such as that shown in FIG. 4(b) is set, an outer edge of component P may be outside the upper limit of the reference image data due to size difference of components P caused by manufacturing allowances or a slight positional deviation, which means that controller 19 is more likely to judge that a component pickup error (image processing error) has occurred. In contrast, if reference image data such as that shown in FIG. 4(a) is set, compared to FIG. 4(b), cases in which controller 19 judges an error unnecessarily are curtailed. Note that, although not shown in the figures, it is a problem if the tolerance widths of the upper limit and the lower limit of the reference image data are set too large, as this means that controller 19 will not detect errors that it should. As described above, the frequency at which controller 19 judges component pickup errors to have occurred during mounting of components P depends on the reference image data that is set. Thus, work of setting reference image data of components P is work that affects the productivity of mounting device 11. Below, the work performed by an operator of setting reference image data is referred to as "work type 2."

Nozzle stocker 18 is a box that stocks multiple types of suction nozzles 14; an operator is able to perform switching of suction nozzles 14. Also, suction nozzles 14 suitable for mounting components P are attached to mounting head 15 from the suction nozzles 14 stocked in nozzle stocker 18.

Figure 5A:
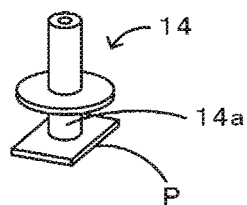
Figure 5B:
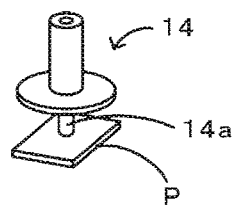

Here, the suction nozzles 14 used for mounting are set by an operator performing setting work at management computer 80 to match the components P to be mounted, and the types of the set suction nozzles 14 are memorized in advance on the HDD of controller 19. Each drawing in FIG. 5 shows an example of a type of suction nozzle 14 set by an operator. It is desirable to set a suction nozzle 14 suitable for the type (size and shape and so on) of component P and the type of board S on which component P is to be mounted; however, operators set various suction nozzles 14 depending on their experience and ability. For example, as in FIG. 5(a), an operator may set a nozzle suction 14 with a lower pickup section 14a of a size suitable for component P, or, as in FIG. 5(b), an operator may set a nozzle suction 14 with a lower pickup section 14a of a size too small for component P. Also, although not shown in the figures, an operator may also set a pickup section 14a that is too big for component P. If the size of pickup section 14a is too small, there are cases in which suction nozzle 14 cannot maintain the appropriate suction force. Also, if the size of pickup section 14a is too big, pickup section 14a may easily protrude outside component P if pickup position deviation occurs for component P, resulting in cases in which suction nozzle 14 cannot maintain the appropriate suction force. If nozzle 14 cannot maintain the appropriate suction force, errors such as component P falling during movement of mounting head 15 occur more easily. That is, the frequency at which errors occur during mounting depends on the setting of the types of suction nozzles 14. Thus, work of setting the type of suction nozzles 14 used in mounting is work that affects the productivity of mounting device 11. Below, the work performed by an operator of setting suction nozzles 14 is referred to as "work type 3."

Management computer 80 is configured from a microprocessor based around CPU 81, ROM 82 that memorizes various processing programs and the like, RAM 83 that memorizes data temporarily, HDD 84 that rewritably memorizes various data, and is configured to be capable of communication with controller 19 of each mounting device 11. Here, with mounting system 10 of the present disclosure, an operator must log on by entering identification information, and operators for whom identification information has been registered in HDD 84 are able to log on. Also, HDD 84 memorizes work history management information 84a that is information of work performed by a logged-on operator, and work authority management information 84b that is information of the authority of an operator with respect to each type of work, work types 1 to 3; these are described in detail later. Further, management computer 80 is capable of having signals entered from input device 86 such as a mouse or keyboard, and of outputting various information on display 88.

Described next is operation of mounting system 10 as configured above. FIG. 6 is a flowchart showing an example of a main processing routine performed by CPU 81 of management computer 80. This routine is performed when an operator enters identification information and a password using entry device 86 in order to log on with a logon screen, which is not shown, displayed on display device 88.

When this main processing routine is performed, CPU 81 of management computer 80 first performs logon reception processing (step S100). CPU 81 of management computer 80, during logon reception processing, performs processing of comparing the identification information and password entered by the operator at the logon screen, and identification information and passwords of operators memorized in HDD 84. In a case in which the comparison results do not match, management computer 80 performs processing to display that fact and performs processing requesting that the identification information and password be entered again. CPU 81 of management computer 80, when performing logon reception processing, displays a mode selection screen, selectable on which are a "work" mode for the operator to perform work of work types 1 to 3 described above and a "production mode" which makes mounting device 11 perform board mounting processing, on display 88 (step S110), and judges whether "work" mode has been selected (step S120), and judges whether "production" mode has been selected (step S130). Note that an operator may also select "log off" at the mode selection screen. If CPU 81 of management computer 80 judges that "log off" has been selected, logoff processing such as clearing the logged-on status of the operator is performed and the main processing routine ends.

When CPU 81 of management computer 80 judges that "work" mode has been selected in step S120, CPU 81 performs work mode processing (step S150); and when CPU 81 judges that "production" mode was selected in steps S120 and S130 instead of "work" mode, performs production mode processing (step S160), CPU 81 of management computer 80, when each mode processing has been completed, returns to the processing of step S110 and displays the mode selection screen. The production mode processing of step S160 is described in detail below. Note that, CPU 81 of management computer 80, in each mode processing, registers in HDD 84 whether the logged on operator performed any of the work of work types 1 to 3, as the above work history management information 84a. FIG. 7 shows an example of work history management information 84a. As shown in the figure, work history information 84a registers which of the three work types 1 to 3 the work performed during the work mode was, linked to the identification information of the operator who performed the work, Work history management information 84a, during work mode processing, registers the work start time and the work finish time of an operator with identification information of ID01, and the work contents performed by the operator (work type 1, work type 2). Note that, this work history management information 84a may also be registered as part of logoff processing. Also, registering the work start time and the work finish time is not essential.

Production mode processing of step S160 is performed based on the flowchart of FIG. 8. CPU 81 of management computer 80, when performing production mode processing, first outputs a mounting instruction such that each mounting device 11 performs board mounting processing (step S200), and then waits for board mounting processing to be completed (step S210). Each mounting device 11 that receives the mounting instruction successively performs mounting processing of components P onto board S. Then, when board mounting processing is complete, CPU 81 of management computer 80 performs analysis processing of productivity for the completed board mounting processing (step S220), and judges whether productivity this time has lowered (step S230).

Here, if CPU 81 of management computer 80 performs processing of steps S220 and S230, it performs them, for example, as follows. First, the production rate this time is obtained by dividing the production amount (for example, the production quantity of boards S) by the production time required of mounting devices 11, and is registered in HDD 84 along with information of the type of board S, and the quantity of mounted components S, and the like. Note that, the time required for production is the total of the operating time during which mounting devices 11 were operating, and the stopped time during which stoppages occurred due to trouble and so on. Next, CPU 81 of management computer 80 extracts production rates out of the past production rates registered in HDD 84 close to the type of board S and the quantity of components P for which production processing was performed this time, and calculates an average value of those production rates, then compares the average value calculated from the past production rates to the production rate for this time. Next, if the production rate this time is lower than the average value of past production rates, CPU 81 judges that productivity has lowered in step S230. Note that, it may be judged that productivity has lowered if the production rate this time is lower than the past production rates by a predetermined ratio or greater (for example, a few % or more than 10%). Also, it may be judged that productivity has lowered if the production rate this time is lower than the production rate last time, or it may be judged that productivity has lowered if the production rate this time is lower than a reference production rate. The reference production rate may be calculated in advance as a theoretical value based on the type of board S and the quantity of mounted components P and so on.

If CPU 81 of management computer 80 judges that productivity has not lowered in step S230, production mode processing is ended. Also, if CPU 81 of management computer 80 judges that productivity has lowered in step S230, in work mode processing, based on work history management information 84a memorized in HDD 84, operators who performed work before the board mounting processing this time and the work type of the performed work are identified (step S240). Next, CPU 81 of management computer 80 retrieves the management value P and warning result for the identified work type of the identified operator from work authority management information 84b memorized in HDD 84 (step S250).

FIG. 9 shows an example of work authority management information 84b. As shown in the figure, registered in work authority management information 84b are a management value P warning result, and performance restriction for each work type 1 to 3 linked to the identification information of operators. The warning result is information indicating whether a warning has been performed with respect to an operator for defective work, the performance restriction is information indicating whether a restriction is in place that does not allow the operator to perform the work, and management value P is a value used for judging whether to perform a warning or apply a restriction to work. The default for warning result is "not warned yet," and the default for performance restriction is "no restriction." Note that, for example, with work history management information 84*a* of FIG. 7, because it is registered that work of work type 1 and 2 has been performed by an operator with the identification information "ID01," CPU 81 of management computer 80, in processing of step S250, retrieves information of work type 1 and 2 of an operator whose identification information is ID01 from work authority management information 84*b*. That is, CPU 81 of management computer 80 retrieves a warning result of "not warned yet" and management value P with a value of "1" for work type 1, and a warning result of "not warned yet" and management value P with a value of "0" for work type 2.

CPU 81 of management computer 80, after retrieving management value P and the warning result, updates management value P of work authority management information by an increment of one-by-one for each retrieved management value P (step S260). In this way, management value P is updated incrementally one-by-one each time an operator lowers productivity of mounting device 22, thus is a value indicating the number of times the operator has lowered productivity of mounting device 11. Next, CPU 81 of management computer 80 judges whether the retrieved warning result is "warning done" (step S270). If CPU 81 of management computer 80 judges the retrieved warning result is not "warning done," CPU 81 judges whether management value P is equal to a greater than a first threshold value P1 (step S280), In the present embodiment, the first threshold P1 is a value of "2." When CPU 81 of management computer 80 judges that management value P is equal to or greater than first threshold P1, CPU 81 warns the identified operator that the performance limit is close for an identified work type (step S290), updates the warning result of work authority management information 84*b* to "warning done" (step S300), and ends production mode processing. Warnings to an operator are, for example, performed by displaying the operator identification information and work type, and an indication that a work performance restriction is close, on display 88. Note that, CPU 81 of management computer 80 updates management value P of the value "1" for work type 1 retrieved in step S250 with the value "2" in step S260, and updates the management value P of the value "0" for work type 2 retrieved in step S250 with the value "1" in step S260. Therefore, CPU 81 of management computer 80, in steps S280 and S290, judges whether management value P of work type 1 is equal to or greater than first threshold value P1, and performs a warning with respect to work type 1. On the other hand, CPU 81 of management computer 80, when judging in step S270 that management value P is not equal to or larger than first threshold P1, ends production mode processing. Thus, CPU 81 of management computer 80 does not perform a warning to an operator the first time that productivity is lowered, but does perform a warning to an operator the second time and above that productivity is lowered.

Also, if CPU 81 of management computer 80 judges the retrieved warning result is "warning done" in step S270, CPU 81 judges whether management value P is equal to or greater than a second threshold value P2 (step S310). Here, the second threshold value P2 is larger than the first threshold value P1, and in the present embodiment, the second threshold P2 is a value of 4. When CPU 81 of management computer 80 judges in step S310 that management value P is not equal to or greater than second threshold P2, CPU 81 warns the identified operator that the performance limit is close for the identified work type (step S320) and ends production mode processing. Note that, CPU 81 of management computer 80 performs processing of step S320 in the same manner as processing of step S290. On the other hand, when CPU 81 of management computer 80 judges that management value P is equal to or greater than second threshold P2 in step S310, CPU 81 notifies the identified operator that a performance restriction has been applied for the identified work type (step S330), updates the performance restriction of work authority management information 84*b* to "performance restriction exists" (step S340), and ends production mode processing.

In this way, in production mode processing, CPU 81 of management computer 80, when management value P that represents the number of times productivity has been lowered reaches first threshold P1 (first predetermined quantity), performs a warning to the operator, and when management value P has exceeded first threshold value P1 and reached second threshold value P2 (second predetermined quantity), applies a performance restriction on the operator for the work. Also, as in the present embodiment, in a case in which first threshold P1 and second threshold P2 are not consecutive values, performs a warning to the operator when management value P has exceeded first threshold P1 but has not yet reached second threshold P2. Note that, with work authority management information 84*b* shown in FIG. 9, the operator with the identification information "ID02" has a management value P of "2" for work type 1, a management value P of "3" for work type 3, and both are "warning done." Thus, when the operator "ID02" performs work of work type 1, if productivity is lowered twice more, a performance restriction will be applied for the work of work type 1; and when the operator "ID02" performs work of work type 3, if productivity is lowered once more, a performance restriction will be applied for the work of work type 3. Note that, warnings and performance restrictions may be not only displayed on display 88 of management computer 80, management computer 80 may be configured to be able to communicate with a computer or mobile terminal of a manager of the operator, such that warnings and performance restrictions are notified to the computer or mobile terminal of the manager.

FIG. 10 shows work mode processing. CPU 81 of management computer 80, when performing work mode processing, first, displays a work type selection screen on display 88 for an operator to select a work type (step S400), and then judges whether an operator has selected a work type (step S410). CPU 81 of management computer 80, if judging that an operator has selected a work type, retrieves the warning result and performance restriction for the work type selected by the operator who is logged on based on the work authority management information 84*b* memorized in HDD 84 (step S420), and judges whether the performance restriction is "performance restriction exists" for the work type selected by the operator (step S430). If CPU 81 of management computer 80 judges that the performance restriction is "performance restriction exists," CPU 81 displays the fact that the operator cannot perform the work for the selected work type due to the performance restriction on display 88 (step S440) and then returns to the work selection screen of step S400. For example, with work authority management information 84*b* shown in FIG. 9, the operator with the identification information "ID03" has "performance restriction exists" for work type 2. Thus, if the operator "ID03" selected work type 2, CPU 81 of management computer 80 judges that the performance restriction is "performance restriction exists" and that work cannot be performed. In this way, if a performance restriction was applied because management value P that is the number of times productivity has been lowered is equal to or greater than a threshold value P2 with a value of "2" in production mode processing, subsequently, CPU 81 of management computer 80 does not allow that operator to perform that work. Thus, with the present embodiment, it is possible to curtail cases of repeatedly lowering the productivity of mounting device 11 by the same operator performing work of the same work type.

Also, CPU 81 of management computer 80, if judging that the result is not "performance restriction exists" in step S430, judges whether the warning result for work type selected by the operator is "warning done" (step S450). CPU 81 of management computer 80, if judging that the result is "warning done," displays a caution on display 88 to warn the operator that a performance restriction is close (step S460), and receives the work of the work type selected by the operator (step S470). Step S470 is the step for receiving input operations of each setting required for the work via the operator operating input device 86. That is, CPU 81 of management computer 80, in a case in which the result is "performance restriction exists," does not receive input operations of the operator, and in a case in which the result is "no restriction," receives input operations of the operator. In contrast, if CPU 81 of management computer 80 judges in step S450 that the warning result is not "warning done," CPU 81 skips the processing of step S460 and receives work in step S470. In this way, for a work type for which the result is "warning done," the operator is allowed to perform the work while being careful due to the caution being issued to the operator when performing the work. Accordingly, with the present embodiment, it is possible to effectively curtail lowered productivity caused by the same operator performing work of the same work type.

Further, CPU 81 of management computer 80, if judging whether work of the operator has been completed (step S480), and judging that work has been completed, registers the work type performed this time linked to the identification information of the operator as work history in work history management information 84*a* of HDD 84 (step S490), and end work mode processing. In the processing of step S490, CPU 81 of management computer 80 registers work history management information 84*a*, an example of which is shown in FIG. 7, in HDD 84.

The above-described present embodiment of mounting system 10, in a case in which the productivity of mounting device 11 has lowered, identifies the operator who lowered the productivity based on work history management information 84*a*, and if the quantity of times (management value P) that the identified operator has lowered productivity reaches second threshold value P2 (predetermined quantity), applies a performance restriction on subsequent work; thus, the present embodiment curtails the repeated lowering of productivity caused by the work of an operator.

Further, mounting system 10 is provided with input device 86 for an operator to perform input operations required for the work of mounting device 11, and CPU 81 of management computer 80, in a case of judging that there is no performance restriction in the processing of step S430 of work mode processing, receives the input operations to input device 86 of the operator such that the processing of step S470 is performed; and in a case of judging that there is a performance restriction in the processing of step S430 of work mode processing, does not receive the input operations to input device 86 of the operator such that the processing of step S470 is not performed. Thus, with the present embodiment, it is possible to reliably prevent setting work being performed by an operator to whom a performance restriction has been applied.

Further, for mounting system 10, multiple types of work, that is work types 1 to 3, are performable as work related to production of mounting device 11, management computer 80 identifiably memorizes the operator and the work type in work history management information 84*a*, and CPU 81 of management computer 80 identifies the operator and work type for which productivity was lowered in production mode processing, and applies a performance restriction on the identified operator for the identified work type. Thus, with the present embodiment, it is possible to efficiently apply performance restrictions by identifying work for which operators tend to lower productivity, and it is possible to apply appropriate performance restrictions without applying performance restrictions to operators in excess of what is necessary.

Further, mounting system 10, before CPU 81 of management computer 80 applies a performance restriction, performs a warning to the operator indicating that a performance restriction is close, such that the operator is allowed to perform the work while being careful. Thus, compared to a case in which performance restrictions are applied without advanced notice, operators are given an opportunity to improve their work.

Further, with mounting system 10, CPU 81 of management computer 80 counts the number of times that an operator has lowered productivity (management value P), and when the count quantity reaches a predetermined threshold of P2, applies a performance restriction; thus the processing for applying a performance restriction can be made easy.

Meanwhile, it goes without saying that the disclosure is not limited to the above-mentioned embodiment and various embodiments may be applied within the technical scope of the disclosure.

For example, in the above embodiment, management value P is provided for each work type, but embodiments are not restricted to this, and management value P does not have to be provided for each work type. In this case, management value P may be provided for each operator without being provided for each work type.

With the above embodiment, management value P is provided without distinguishing between the multiple mounting devices 11 provided in mounting system 10, however, embodiments are not restricted to this, and management value P may be provided for each mounting device 11. Unlike the above embodiment, if the configuration of the multiple mounting devices 11 provided in mounting system 10 is different, the characteristics of each mounting device 11 will be different, thus there are cases in which worked performed by operators for each mounting device 11 will have a tendency to vary. By providing management value P for each mounting device 11, it is possible to dramatically curtail lowered productivity caused by work of operators.

In the above embodiment, CPU 81 of management computer 80 performed a warning during work mode processing as a caution to operators, but embodiments are not restricted to this and it is not necessary to perform a caution. In this case, S450 and S460 of work mode processing of FIG. 10 may be omitted.

In the above embodiment, CPU 81 of management computer 80 performed a warning during production mode processing before applying a performance restriction, but embodiments are not restricted to this and it is not necessary to perform a warning. In this case, processing of S270 to S300 and S320 of production mode processing of FIG. 8, and processing of S450 and S460 of work mode processing of FIG. 10 may be omitted, and it is not necessary to register a warning result in work authority management information 84b of FIG. 9.

In the above embodiment, CPU 81 of management computer 80 uses a production rate obtained by dividing the production amount (the production quantity of boards S) by the production time required of production devices 11 as an indication of productivity, but embodiments are not restricted to this, and any item that enables lowered productivity to be detected may be used. For example, the stop time during which mounting device 11 is stopped during production due to trouble may be used, and productivity may be judged to have been lowered if the stop time is equal to or greater than a predetermined time. In this case, management value P, instead of being a count of the number of times productivity has been lowered, may be the accumulated stop time. That is, when management value P that is an accumulated stop time reaches first threshold value P1 (first predetermined time), a warning is performed, and when management value P that is an accumulated stop time reaches second threshold value P2 (second predetermined time), a performance restriction is applied for the work, or the like.

In the above embodiment, in a case in which CPU 81 of management computer 80 detects lowered productivity in production mode processing, management value P is retrieved for the work type corresponding to the operator who performed the work in the immediately prior work mode processing; however, embodiments are not limited to this, and in a case in which lowered productivity is detected in production mode processing, management value P may be retrieved for the work type corresponding to operators who performed the work earlier than that. For example, the work start time or the work finish time may be retrieved as management value P for the work type corresponding to the operators who performed work until a predetermined time before the production start time or the production finish time. Alternatively, for each of multiple types of work types, management values P of operators who performed the most recent work may each by retrieved. In these cases, embodiments are not restricted to retrieving management value P of one operator, management value P of multiple operators may be retrieved.

In the above embodiment, an example of the present disclosure was applied to mounting system 10 provided with multiple mounting devices 11; however, embodiments are not limited to this, and may be applied to a mounting system 10 provided with only one mounting device 11, or may be applied to a mounting system provided with various types of devices other than mounting device 11 such as a printer that prints solder onto board S using screen printing. Also, the present disclosure is not limited to mounting system 10 provided with mounting device 11 that mounts components P on board S, and may be applied to any production system provided with a production device that allows an operator to perform work related to production of the production device. For example, it may be applied to various types of production systems, such as an assembly system provided with an assembly device that assembles various components and that allows an operator to perform work related to the assembly device, or a machining system provided with a machining device that performs machining of various components and that allows an operator to perform work related to the machining device.

INDUSTRIAL APPLICABILITY

The present disclosure may be used in the general field of industrial technology as well as in the mounting field in which components are mounted on a board.

REFERENCE SIGNS LIST

10: mounting system; 11: mounting device; 12: supply unit; 13: board processing unit; 14: suction nozzle; 14a: pickup section; 15: mounting head; 16: head moving mechanism; 17: camera unit; 18: nozzle stocker; 19: controller; 80: management computer; 81: CPU; 82: ROM; 83: RAM; 84: HDD; 84a: work history management information; 84b: work authority management information; 86: input device; 88: display; P: component; S: board

The invention claimed is:

1. A production system, provided with a production device, for allowing an operator to perform work related to production of the production device, the production system comprising:
a memorizing means that memorizes performance information of work related to production of the production device performed by an operator such that the operator is identifiable;
a detecting means that detects lowered productivity of the production device;
an identifying means that, in a case in which lowered productivity of the production device is detected, identifies the operator who caused the lowered productivity based on the performance information;
a restricting means that applies a performance restriction on the identified operator for the work related to production of the production device; and
an entry means for the operator to perform entry operation required for the work related to the production of the production device, wherein
in a case in which the restricting means has not applied the performance restriction to the work, entry operations by the operator to the entry means are received, and
in a case in which the restricting means has applied the performance restriction to the work, entry operations by the operator to the entry means are not received.

2. The production system according to claim 1, wherein
multiple types of works are performable as work related to production of the production device,
the memorizing means memorizes the performance information such that the operator and the work type are identifiable,
the identifying means identifies the work type and the operator that caused the lowered productivity, and
the restricting means applies the performance restriction with respect to the identified work type of the identified operator.

3. The production system according to claim 1, further provided with
a warning means that performs a warning with respect to the identified operator before the restricting means applies the performance restriction.

4. The production system according to claim 1, wherein the restricting means counts the number of times the identified operator has lowered productivity, and applies the performance restriction when the count has reached a predetermined quantity.

5. A production system, provided with a production device, for allowing an operator to perform work related to production of the production device, the production system comprising:

circuitry configured to:
memorize performance information of work related to production of the production device performed by an operator such that the operator is identifiable;
detect lowered productivity of the production device;
identify, in a case in which lowered productivity of the production device is detected, the operator who caused the lowered productivity based on the performance information; and
apply a performance restriction on the identified operator for the work related to production of the production device; and an entry device for the operator to perform entry operation required for the work related to the production of the production device, wherein in a case in which the circuitry has not applied the performance restriction to the work, entry operations by the operator to the entry device are received, and in a case in which the circuitry has applied the performance restriction to the work, entry operations by the operator to the entry device are not received.

6. The production system according to claim 5, wherein multiple types of works are performable as work related to production of the production device, and the circuitry is further configured to:
memorize the performance information such that the operator and the work type are identifiable,
identify the work type and the operator that caused the lowered productivity, and
apply the performance restriction with respect to the identified work type of the identified operator.

7. The production system according to claim 5, wherein the circuitry is further configured to perform a warning with respect to the identified operator before the performance restriction is applied.

8. The production system according to claim 5, wherein the circuitry is further configured to
count the number of times the identified operator has lowered productivity, and
apply the performance restriction when the count has reached a predetermined quantity.

* * * * *